United States Patent [19]

Moskowitz

[11] Patent Number: 5,268,186

[45] Date of Patent: Dec. 7, 1993

[54] PRODUCT AND PROCESS OF MAKING HEAT STABLE FLAVORS CONTAINING FATTY ACIDS

[75] Inventor: Gerard Moskowitz, Cincinnati, Ohio

[73] Assignee: Fries & Fries, Inc., Cincinnati, Ohio

[21] Appl. No.: 933,887

[22] Filed: Aug. 21, 1992

Related U.S. Application Data

[63] Continuation of Ser. No. 824,729, Jan. 20, 1992, abandoned, which is a continuation of Ser. No. 549,626, Jul. 6, 1990, abandoned, which is a continuation of Ser. No. 270,055, Nov. 14, 1988, abandoned.

[51] Int. Cl.$^5$ .................................................. A23L 1/22
[52] U.S. Cl. ...................................... 426/93; 426/234; 426/243; 426/309; 426/534; 426/627
[58] Field of Search ................ 426/36, 107, 234, 243, 426/610, 650, 654, 627, 35, 93, 309, 534

[56] References Cited

U.S. PATENT DOCUMENTS

| | | | |
|---|---|---|---|
| 2,320,319 | 5/1943 | Black | 426/610 |
| 3,051,571 | 8/1962 | Pergament | 426/454 |
| 3,653,921 | 4/1972 | Buhler et al. | 426/580 |
| 4,296,132 | 10/1981 | Lazarus et al. | 426/307 |
| 4,296,132 | 10/1981 | Lazarus et al. | 426/630 |

*Primary Examiner*—Helen F. Pratt
*Attorney, Agent, or Firm*—Wood, Herron & Evans

[57] ABSTRACT

Heat stable flavor compositions are disclosed containing a flavor having a free fatty acid as an essential flavor component in a multivalent metal salt as the heat stabilizer for the fatty acid. The flavor is stabilized against development of obnoxious odors upon heating and still provides acceptable taste upon mastication by a consumer. Stabilized cheese flavors are provided. Microwavable foodstuffs and flavors having low molecular weight fatty acids are also stabilized against heat degradation.

21 Claims, No Drawings

PRODUCT AND PROCESS OF MAKING HEAT STABLE FLAVORS CONTAINING FATTY ACIDS

This application is a continuation of application Ser. No. 824,729, filed Jan. 20, 1992, which in turn is a continuation of application Ser. No. 07/549,626, filed Jul. 6, 1990, which in turn is a continuation of application Ser. No. 270,055, filed Nov. 14, 1988, all abandoned.

BACKGROUND OF THE INVENTION

The chemical compositions of flavors are quite complex. An example of a complex flavor composition is cheese. Free low molecular weight fatty acids such as butyric, caproic, caprylic and capric are important components of cheese flavor. Liebich, H. M. et al, 1970, *J. Chromat. Science*, 8, 355 suggests that free fatty acids are the basic components of cheese flavor. In cheeses such as Parmesan and Romano, they constitute the critical flavor components of the profile. Their role in Cheddar cheese has not been as well defined as for Parmesan and Romano, but they are critical components, nonetheless.

Enzyme modified cheese (EMC) is cheese that has been treated with enzyme, usually lipases and proteases, to produce an intense cheese flavor. The role of the lipase enzymes is to split the butter fat triglyceride and release free fatty acids which contribute to the cheese perception of the product. EMC's are used extensively throughout the food industry to produce, enhance or develop cheese flavor profiles.

Recent food trends toward microwave cooking to prepare snacks such as popcorn, and minimally processed foods requiring limited preparation, involve heating and have increased the demand for flavors that can withstand the stress of these processes. Other convenient-to-prepare foods constitute an increasing percentage of new products. Flavors must be modified or redesigned to effectively perform under these conditions.

In microwave and other heating processes, flavor components can evaporate or distill off and produce an objectionable odor. This is more likely to occur in a flavor high in free fatty acids such as a cheese flavor. Since most cheese flavors will contain high levels of low molecular weight fatty acids, they are not suitable for microwave applications such as cheese popcorn. Very low water in microwavable foods such as popcorn enhance objectionable odors. Parmesan, Cheddar or Romano type flavors, high in low molecular weight free fatty acids, produce upon microwave heating objectionable odors described as dirty sock, baby burp or astringent and annoying. Such objectionable odors have a tendency to linger, absorb on clothes and skin, and persist for hours or even days.

There is a need to provide more heat stable flavor compositions containing a free fatty acid as an essential flavor component. This need is especially accentuated in view of the increasing trends toward microwave treatment of foods where flavors must be modified or redesigned to effectively perform under such special heating conditions.

SUMMARY OF THE INVENTION

This invention is directed to a heat stable flavor containing a free fatty acid as an essential flavor component that is stabilized by a multivalent metal salt against the detrimental effects of heat. The compositions are formulated to provide an acceptable pH for stabilizing a flavor aroma and taste upon subjecting the flavor composition to heat. This invention is also predicated in part upon the discovery that multivalent metal salts will stabilize essential free fatty acid flavor components in flavors such as cheese flavors when such salts are incorporated in a flavor composition at an acceptable pH on the order of at least about 2.5. New microwavable foods and flavors are also provided by this invention that perform under the stress of such processes.

An objective of the present invention is to stabilize a flavor having essential free fatty acid flavor components against degradation and/or volatilization when subjected to heat, yet retain them in the flavor. The heat may be directly applied or may be indirect as is the case with microwave energy. It is also an objective of this invention to allow these stabilized and/or non-volatile free fatty acid components to produce their desired aroma and taste upon mastication and mixing of the food in the mouth. In another of its other attributes, this invention allows for the incorporation of additional levels of fatty acid flavor components in foods to increase the flavor intensity in such foods without increasing the degree of unacceptable odors and tastes. These objectives and others along with further advantages and benefits of this invention will be understood with reference to the following detailed description.

DETAILED DESCRIPTION

The following detailed description is for purposes of exemplification and to illustrate the best mode for carrying out the present invention. While the detailed operating examples illustrate the invention as it is embodied in cheese flavors, this invention is not limited to cheese flavors. Furthermore, while the invention is also illustrated primarily with respect to microwave heating, other heat processing may be employed such as broiling, baking or boiling. It has been found, however, that the invention is applicable to any flavor where free fatty acids are an essential component of the flavor and heat is required in the preparation of the flavor or final food product in which the flavor is incorporated. The invention is especially applicable to any cheese flavor where free low molecular weight fatty acids are an essential component of the flavor, especially those $C_2$-$C_{12}$ fatty acids that produce upon heating objectionable odors often described as dirty sock, baby burp or the like.

Exemplary of foods or flavors where free fatty acids are essential components include cheese flavors such as Cheddar, Swiss, Parmesan, Romano, or Mozzarella. Such essential free fatty acid flavor components are stabilized according to this invention by a multivalent salt contained in the flavor composition as a heat stabilizer for the fatty acids. The heat stable flavor compositions of this invention must also have an acceptable pH for stabilizing the essential components to provide a desired aroma and taste during heating and thereafter upon mastication by the consumer. Exemplary of the multivalent metal salts that may be employed as a heat stabilizer in accordance with this invention are divalent calcium hydroxide, calcium chloride, calcium oxide, calcium carbonate, calcium acetate, zinc chloride, magnesium hydroxide, magnesium oxide, magnesium carbonate and manganese oxide. Presently, a pH on the order of at least 2.5 is acceptable when such salts are employed in cheese flavor compositions in order to reduce or eliminate the objectionable odors and/or burning of a flavor or foodstuff during heat preparation.

While the objectionable odors are more likely attributable to low molecular weight fatty acids such as $C_2$-$C_{12}$ acids, in its broadest aspects, other free fatty acids are also stabilized and, thus, in its broadest sense, the invention is not limited to the precise chain length of fatty acid. Other acids, for example, of chain lengths up to $C_{22}$ and higher may be stabilized even though objectionable odor problems are not as intense when such higher fatty acid components are employed. While an acceptable pH of at least 2.5 has been found necessary in cheese compositions as indicated above, a usual range of acceptable pH is on the order of about 2.5 to about 8. Above about pH 8, there does not appear to be any advantage in further increasing the pH.

Any foodstuff may be flavored with the stabilized flavors in accordance with the principles of this invention. Furthermore, the foodstuff or flavor composition itself may contain other ingredients that may contribute to desired taste or aroma. This will be understood to a person of ordinary skill in the food and flavor preparations art. While the operating examples hereinafter illustrate the invention with respect to certain foodstuffs and flavors, it should be understood that such operating examples are for purposes of exemplification only. Any foodstuff or flavor may contain stabilized flavor compositions of this invention to obtain the desired benefits. As indicated above, this invention is especially applicable to microwavable foodstuffs where special heating conditions are confronted. The stabilized flavors of this invention have been found to effectively perform under microwave conditions. These and other advantages will be appreciated with reference to the following detailed examples.

EXAMPLE I

Bags of microwavable popcorn containing corn kernels, fat and cheese flavor were packaged. For purposes of this Example I, two cheese flavors with and without the stabilizing multivalent metal salt were first prepared for use in the microwavable cheese flavored popcorn as follows.

Cheese Flavors—A first Cheddar cheese control flavor containing about 75% by weight of free fatty acids of $C_2$-$C_{18}$ saturated and unsaturated chain length was mixed with water and starch, and spray dried by conventional means employing the following amounts of ingredients.

| Cheese Flavor | 0.43 lbs. |
|---|---|
| Water | 2.00 lbs. |
| National Starch 46 | 2.10 lbs. |

Another Cheddar cheese sample containing the salt stabilizer was prepared for comparison with the control and with adjustment of the pH of the above ingredients from an original pH of about 2.8 to about 5 by the addition of solid calcium hydroxide prior to spray drying.

Microwavable Cheese Flavored Popcorn—Microwavable popcorn was then prepared utilizing each of the above cheese flavors along with other ingredients listed in Table I. With reference to Table I, a hard fat Durkee Shortening 321 was heated to soften the fat, and popcorn kernels were added with each of the powdered cheese flavor components. The fat, cheese flavor as prepared above, popcorn kernels and other components of the mixture were placed into the bottom susceptor plate of the popcorn bag and allowed to harden in the refrigerator for several hours. The bag was then removed and placed into a Litton Microwave for popping on a three minutes cycle on high energy. Odor was evaluated at the microwave exhaust by smell. The degree of burning of the plate was also evaluated.

TABLE I

| Enzyme modified Cheddar cheese dried on National 46 starch | 3.8 g |
|---|---|
| Each Cheddar cheese flavor above | 3.9 g |
| Butter flavor | 0.24 g |
| Popcorn kernels | 60.00 g |
| Durkee 321 fat | 37.00 g |
| Salt | 3.00 g |

The batches of popcorn using the Cheddar cheese flavor with and without the calcium hydroxide heat stabilizer were evaluated. Upon microwave popping, the popcorn containing the heat stabilized flavor of this invention with the calcium hydroxide additive was more pleasant and much less offensive than the cheese flavor control without the metal salt. The stabilized flavor of the popcorn upon mastication was also cheesy strong and pleasant, and comparable to the control. Therefore, this Example I demonstrates that a flavor composition containing essential free fatty acid components may be stabilized against degradation and/or volatilization upon heating. The offensive dirty sock odors of the control are reduced or eliminated by employing a multivalent metal salt at an acceptable pH.

EXAMPLE II

For purposes of evaluating the effects of pH on odor upon heating in a microwave environment, the procedures of Example I were repeated except that a series of bags of popcorn kernels were packaged with eight Cheddar cheese flavors prepared with one control having a pH of 2.85 and the remaining seven flavors having calcium hydroxide added to adjust pH to different desired values between 3.5 and 8.2. The odor and degree of burning were evaluated on a scale of 1 to 10. The higher the number, the more severe the odor and burning. Upon formulating and popping corn kernels following the procedures of Example I, the results are reported in Table II.

TABLE II

| pH | ODOR | BURNING |
|---|---|---|
| 2.85 (control) | 9 | 3 |
| 3.5 | 7 | 5 |
| 4.3 | 5 | 5 |
| 5.0 | 3 | 7 |
| 5.5 | 2.5 | 6.5 |
| 6.0 | 3 | 6 |
| 7.2 | 1.5 | 6 |
| 8.2 | 1.5 | 8 |

At the pH level of 2.85 for the control, no calcium hydroxide was added. As indicated in Table II, under these conditions, the odor was obnoxious and unacceptably high at a level of 9, although burning was at a low level. The degree of offensive odor decreased with increasing pH and the quantity of calcium hydroxide added. Additional calcium hydroxide did not decrease the degree of burning on the plate. Under these conditions, sufficient odor suppression occurred at a pH of about 4.3 and above.

EXAMPLE III

The effects of the calcium ion and other anions were observed in a series of experiments as follows. The procedures of Example I were followed except that the indicated salts of Table III were added in place of calcium hydroxide at the same molar level as required to adjust to pH 5 as reported in Example I for Ca(OH)$_2$.

TABLE III

| SALT | FINAL pH | ODOR | BURNING |
|---|---|---|---|
| CaCl$_2$ (Sample #1) | 2.3 | 8 | 7 |
| CaCl$_2$ (Sample #2) at ½ the level of Sample #1 | 2.6 | 4 | 6 |
| CaO | 5 | 2 | 4 |
| CaCO$_3$ | 3.2 | 6 | 5 |
| CaAcetate | 4.2 | 4 | 4 |

With reference to Table III, it has been demonstrated that the calcium ions in other calcium salts were effective at a pH above 2.3. The nature of the anion did not affect the ability of the salt to reduce the obnoxious odor to an acceptable level. It is particularly interesting to note that even though the pH of Sample #2 increased to about 2.6 by a reduction in the calcium chloride level to one half of the level employed in Sample #1, the obnoxious odor nevertheless was reduced from the level of unacceptability to a level of acceptability. In current experiments, calcium hydroxide is preferred as providing the best effect against odor with the least amount of burn.

EXAMPLE IV

The acceptability of other mono- and multivalent metals was explored and the following Table IV represents a series of experiments that were performed following the procedures of Example I except that the indicated salts of Table IV were added. Except where indicated, the enumerated salts of Table IV were added in molar equivalents to the amount of calcium hydroxide required to reach pH 5.

TABLE IV

| SALT | ODOR | BURNING |
|---|---|---|
| ZnCl$_2$ | 4 | 10+++ |
| FeCl$_3$ | 9 | 10(+)10 |
| NaHCO$_3$ | 10 | 8 |
| Mg(OH)$_2$ | 3 | 7 |
| MgO (Sample #1) | 3 | 8 |
| MgO (Sample #2) at 1.3 × the level of Sample #1 to reach pH 5.0 | 3 | 7 |
| MgCO$_3$ | 7 | 6 |
| MnO$_2$ | 6 | 3 |
| KOH | 9 | 10 |
| NaOH | 8 | 8 |

With reference to Table IV, zinc and magnesium salts were also effective in odor suppression although they produced a bit more burning in the microwave. Zinc chloride and ferric chloride salt treated flavors burned very badly and were unacceptable from that standpoint even though zinc suppressed the odor to a great extent. It is also noted, contrary to the suggestions that may be drawn from U.S. Pat. No. 3,653,921, column 3, lines 37-58, that sodium and potassium hydroxide or sodium bicarbonate did not provide any reduction in obnoxious odor and did burn. Therefore, in accordance with its broader teachings, other multivalent metal ions may be employed to produce the benefits of this invention. Monovalent metal ions do not suppress odor nor burning of the components of the system.

EXAMPLE V

A Parmesan cheese flavor was prepared using free fatty acids as a component of the flavor profile and evaluated in rice cooked on the stove. In the experimental sample illustrating the invention, the cheese flavor was titrated to pH 5.9 with Ca(OH)$_2$. In a control sample, no Ca(OH)$_2$ was added. A dirty sock, sour cheese odor was detected in the control sample when the lid of the pan was removed. The odor was intense and objectionable. The experiment sample illustrating the invention was more pleasant with limited dirty sock odor. The flavor of the experimental sample of the invention was preferred.

In view of the above description, it will become apparent to a person of ordinary skill in the art that variations may be made in utilizing this invention without departing from its scope.

What is claimed is:

1. A heat stable flavor composition comprising
   a flavor having a free fatty acid as an essential flavor component and
   a multivalent metal compound contained in said composition as a heat stabilizer for said fatty acid, said composition having an acceptable pH whereby said flavor is stabilized against development of obnoxious odors upon heating and still provides acceptable taste upon mastication by a consumer.

2. The composition of claim 1 wherein said fatty acid is a C$_2$–C$_{22}$ fatty acid.

3. The composition of claim 1 wherein said multivalent metal compound is a divalent metal compound.

4. The composition of claim 3 wherein said divalent compound contains a metal ion selected from the group consisting of calcium, zinc, magnesium and manganese.

5. The composition of claim 1 wherein said compound is calcium hydroxide.

6. The composition of claim 1 wherein said pH is at least about 2.5.

7. The composition of claim 6 wherein said pH is within the range of about 2.5 to about 8.

8. A foodstuff containing the heat stable flavor composition of claim 1.

9. A microwavable foodstuff containing the flavor composition of claim 1.

10. Microwavable popcorn kernels containing a cheese flavor having the composition of claim 1.

11. Microwavable popcorn kernels of claim 10 containing a cheese flavor having calcium hydroxide as the multivalent metal compound stabilizer.

12. A heat stable cheese flavor composition comprising a cheese flavor having free low molecular weight fatty acids as an essential flavor component and
   a multivalent metal compound contained in said composition as a heat stabilizer for said fatty acids, said composition having an acceptable pH whereby said flavor is stabilized against development of obnoxious odors upon heating and still provides acceptable taste upon mastication by a consumer.

13. The composition of claim 12 wherein said cheese flavor is selected from the group of Cheddar, Swiss, Parmesan, Romano and Mozzarella.

14. The composition of claim 12 wherein said free fatty acid is a C$_2$–C$_{12}$ fatty acid chain length.

15. The composition of claim 14 wherein said multivalent compound is a divalent metal compound.

16. The composition of claim 15 wherein said divalent metal compound is calcium hydroxide.

17. A microwavable foodstuff containing the heat stable cheese flavor of claim 12.

18. A microwavable popcorn product containing popcorn kernels, fat and the heat stable cheese flavor of claim 12.

19. A method of stabilizing a flavor having a free fatty acid as an essential flavor component by adding a multivalent metal compound as a heat stabilizer in an effective amount to prevent development of obnoxious odors upon heating of the essential flavor component and to provide acceptable taste upon mastication by a consumer.

20. The method of claim 19 wherein a multivalent metal compound is added to provide a pH for said composition of at least about 2.5.

21. The method of claim 19 wherein said multivalent metal compound is a divalent metal compound.

* * * * *